No. 647,767. Patented Apr. 17, 1900.
L. G. SPENCER.
PICTURE APPARATUS.
(Application filed Jan. 12, 1900.)

(No Model.) 3 Sheets—Sheet 1.

WITNESSES:

INVENTOR
Leonard G. Spencer.
BY
ATTORNEY.

No. 647,767. Patented Apr. 17, 1900.
L. G. SPENCER.
PICTURE APPARATUS.
(Application filed Jan. 12, 1900.)
(No Model.) 3 Sheets—Sheet 2.

WITNESSES:
George T. Hackley
Ounson R. Newell

INVENTOR
Leonard G. Spencer.
BY R. C. Mitchell
ATTORNEY.

No. 647,767. Patented Apr. 17, 1900.
L. G. SPENCER.
PICTURE APPARATUS.
(Application filed Jan. 12, 1900.)
(No Model.) 3 Sheets—Sheet 3.
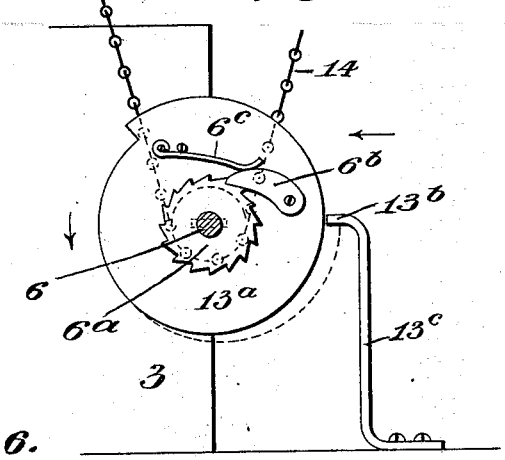
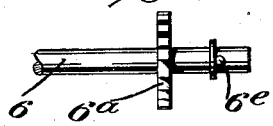
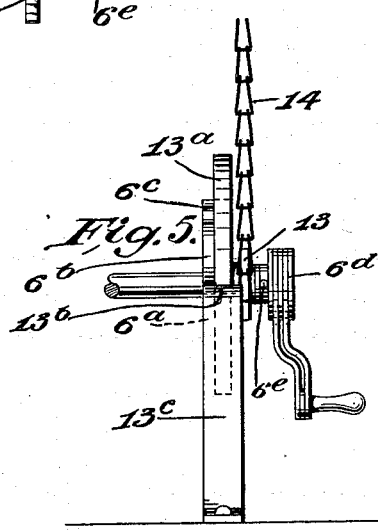
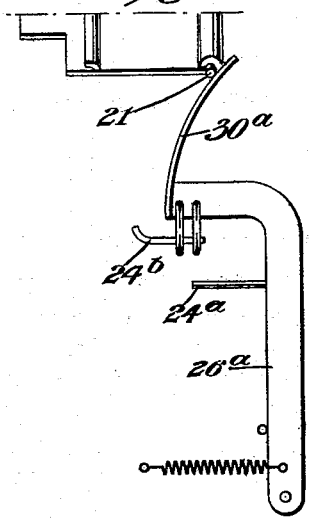
WITNESSES:
George T. Hackley
Alfred Melchon
INVENTOR
Leonard G. Spencer
BY
ATTORNEY.

UNITED STATES PATENT OFFICE.

LEONARD G. SPENCER, OF NEW YORK, N. Y.

PICTURE APPARATUS.

SPECIFICATION forming part of Letters Patent No. 647,767, dated April 17, 1900.

Application filed January 12, 1900. Serial No. 1,183. (No model.)

*To all whom it may concern:*

Be it known that I, LEONARD G. SPENCER, a citizen of the United States, residing at New York city, county and State of New York, have invented certain new and useful Improvements in Picture Apparatus, of which the following is a full, clear, and exact description.

My invention relates to a device for presenting a picture or a series of pictures to view, and I may combine with it at the same time a device for producing certain sounds, such as a tune or a conversation.

Where a tune or a conversation is to be illustrated by the presentation of a picture or a series of pictures, it is usually desirable, particularly in the latter case, that the pictures illustrating the conversation should be exposed for varying lengths of time, as the parts of the conversation, which are illustrated by the different pictures, will be of varying lengths. To accomplish this object and to expose the pictures at the proper moment, I have provided an automatically-operated machine which is simple and easily adjusted and which will not easily get out of order.

Figure 1:
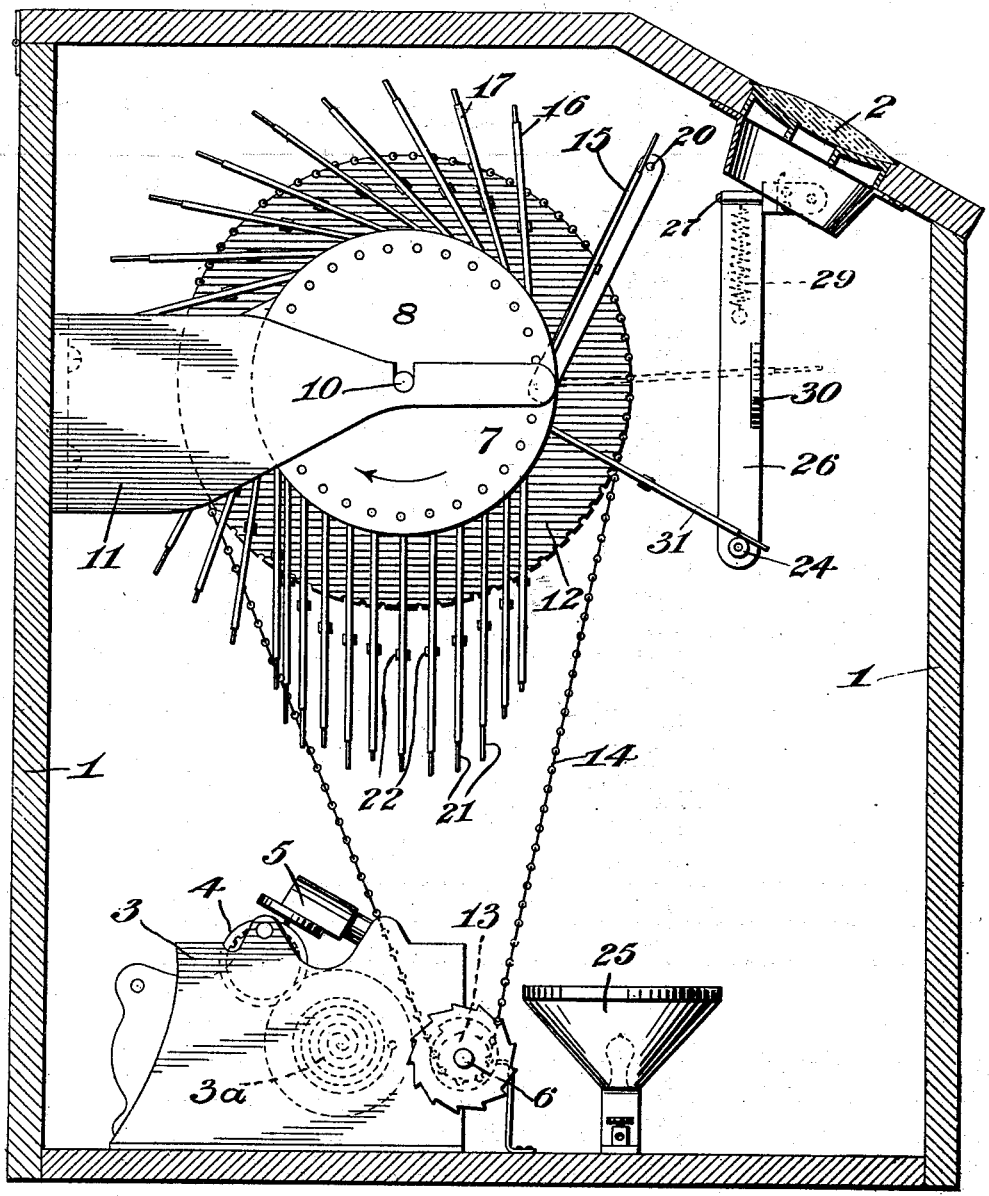
Figure 2:
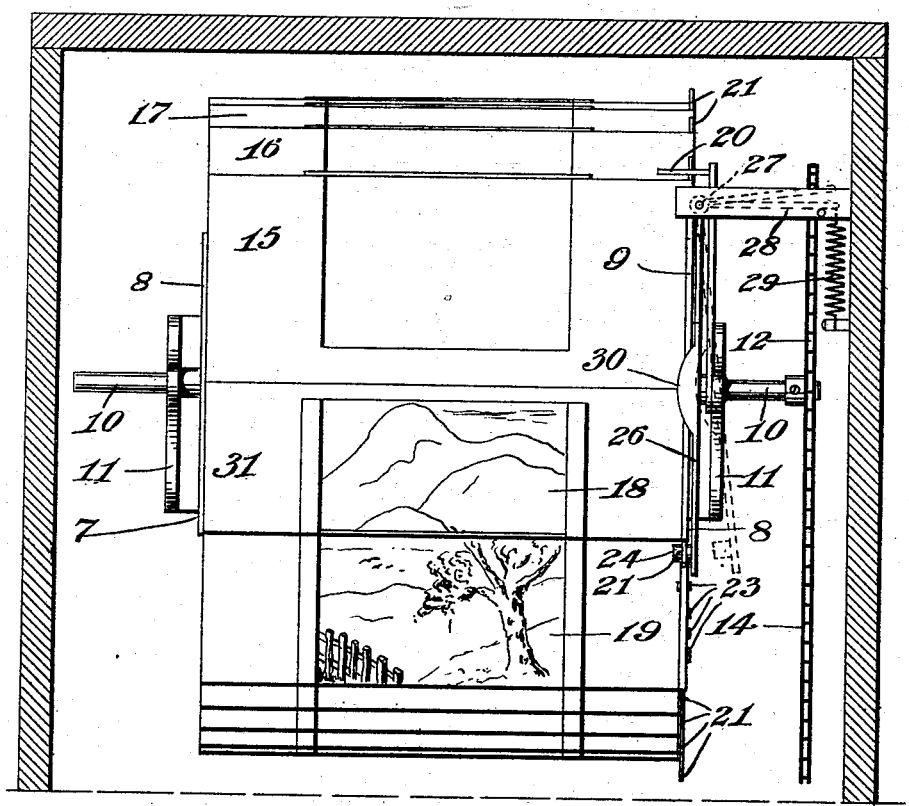
Figure 3:
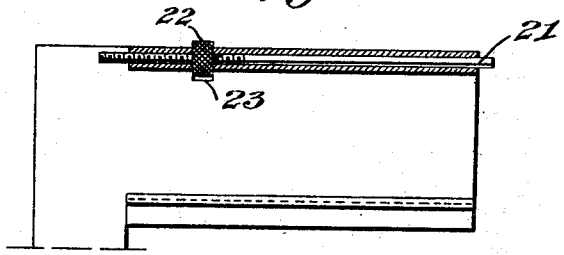

In the preferred embodiment of my invention shown in the drawings, Figure 1 represents a side elevation of the apparatus; Fig. 2, a side elevation at a right angle to Fig. 1. Fig. 3 is a detail. Fig. 4 is a side elevation of the winding device. Fig. 5 is a front elevation of Fig. 4. Fig. 6 is a detail. Fig. 7 is a detail of a modification.

In the above preferred embodiment, 1 is the casing or box which incloses the working parts of the apparatus.

2 is an eyepiece through which the pictures may be observed.

3 is a suitable sound-producing machine, such as a phonograph or music-box, actuated in any suitable manner, as by a spring 3ᵃ.

4 is the record-roll, having one or more records thereon, and 5 the reproducer.

6 is a shaft rotated by the sound-producing machine when the same is in operation.

7 is a movable-picture carrier, in this embodiment formed by disks 8 and 9, rotatably mounted on a shaft 10, supported in brackets 11, as shown in Fig. 2.

12 is a toothed wheel, also attached to the shaft 10, and over this wheel and a second wheel 13 passes a chain or belt 14 to operatively connect the sound-producing machine and the picture apparatus.

24 is a rest against which the pictures lie as they are brought successively and separately into the line of vision, and this rest holds them in the line of vision through the eyepiece 2. The pictures are preferably supported in holders, as seen in Fig. 2, and these pictures may swing on pivots attached to one side of the holders and mounted in the disks 8 and 9, as shown. As the carrier is moved the pictures fall down into the exposed position, as shown by the picture 31. I preferably make these pictures transparent or translucent, and in such case provide a suitable lighting arrangement 25 on the other side of the exposed picture from the eyepiece 2.

To automatically regulate the length of exposure of any picture, I have provided a device operated by and therefore connected with one of the succeeding pictures, preferably the next succeeding picture. In this embodiment I have provided a stationary stop 20, and a part, preferably adjustable, connected with each succeeding picture, which will contact with this stop and accomplish the above object. As seen in Fig. 3, this adjustable part is a screw-threaded pin 21, held in guides formed by the turned-over edge of the picture-holder and provided with an adjusting thumb-nut 22, located in the slot 23 in the picture-holder. As the picture-carrier is rotated the successive pictures, such as picture 15, will fall forward and the pins will successively lie against the stop 20. The picture 31 being in its exposed position will on the rotation of the carrier be only slightly moved and will be held substantially stationary in the line of vision. As the carrier is rotated the picture 15 will be bodily moved downward, the pin sliding downward on the stop 20. When the carrier is rotated a distance, determined by the length of the pin, sufficient to carry the pin below the stop, the picture will swing forward and downward on its pivot, as shown in dotted lines in Fig. 1, and release the picture 31, allowing it to fall. In this way the pin attached to the picture 15 regulates the length of exposure of the exposed picture, and as the pins on the pictures may be of different lengths the length of exposure of the different pictures is automatically varied. For example, in Fig. 1 the length of exposure of picture 31 will be greater than that of picture 15, because the pin on picture 15 is of greater length than the pin on picture 16.

In the present embodiment the whole machine is intended to be stationary—that is, as distinguished from one which is moved along from place to place, as on a railway-train—and in the present embodiment the means which automatically expose the different pictures for different lengths of time is operated by the machine itself.

If the pictures are translucent or transparent and the source of light located behind the exposed picture, it is of course desirable that the exposed picture should be removed from the line of vision as the next succeeding picture is brought into the exposed position. To accomplish this result, I preferably provide a movable rest and means operated by the movement of preferably the next succeeding picture to automatically release the exposed picture. The rest 24 is in this embodiment a lug extending out from the arm 26, pivoted at 27. This arm 26 has another arm 28, as shown in Fig. 2, attached to it, to which is attached a spring 29, which normally keeps the arm and rest in the position shown in full lines in said Fig. 2.

30 is a cam-face adapted to be struck by the next succeeding picture 15 as the same falls forward. This will throw the arm 26 and rest 24 back into the position shown in dotted lines in Fig. 2. This will release the exposed picture 31, which will then drop down out of the line of vision. As the picture 15 then passes beyond the cam 30 the spring 29 will snap the arm and rest back in time for the rest to receive the picture 15 thereon in the same manner as the picture 31 is shown to be held.

In Fig. 7 I have shown a modification of the movable rest. 24$^a$ is a lug extending out from the arm 26$^a$, which corresponds in operation to the heretofore-described pivoted lever 26. 30$^a$ is a cam adapted to be struck by a falling picture. As the pin 21 on the picture strikes the cam 30$^a$ the pivoted lever 26$^a$ is moved one side (in this embodiment to the right) against the tension of the coiled spring and the pin strikes the intermediate rest 24$^b$, which intermediate rest may be supported by two hangers, as shown in the drawings. This positively arrests the falling of the picture which is just being brought into the exposed position and prevents any possibility of the picture not striking the rest 24$^a$. The intermediate rest 24$^b$ can slide along beneath the pin 21, and as the lever 26$^a$ is drawn to the left by the coiled spring this action will take place, and when the right-hand end of the intermediate rest 24$^b$ passes from under the pin the pin will drop onto the rest 24$^a$.

In winding up the device preparatory to starting I have found it desirable to provide against lost motion between the sound-producing device and picture-carrier, so that the sound-producing device and picture-carrier may start simultaneously and in harmony.

In Figs. 4, 5, and 6 the driving-shaft 6 is fixedly secured to a ratchet-wheel 6$^a$.

13$^a$ is a cam loosely mounted on the shaft 6 adjacent the ratchet 13 before mentioned. The cam 13$^a$ carries the sprocket 13 for the drive chain or belt 14.

6$^b$ is a pawl carried by the cam 13$^a$, which pawl engages with the ratchet-wheel 6$^a$.

6$^c$ is a spring which forces the pawl 6$^b$ against the ratchet-wheel 6$^a$.

13$^b$ is a stop carried, preferably, by a spring-standard 13$^c$.

In winding up the machine the shaft 6 is rotated in the direction of the arrow in Fig. 3 by any suitable means, such as a removable crank 6$^d$, which may engage a pin 6$^e$, fixed in the shaft 6. The cam 13$^a$ is also turned by reason of the pawl 6$^b$ being strongly held by the spring 6$^c$ into a notch in the ratchet-wheel. The picture-carrier is thereby rotated until the movement of the cam 13$^a$ is arrested by striking the stop 13$^b$. The stopping of the cam 13$^a$ does not, however, hinder the winding of the shaft 6, and the winding may therefore be continued to a desired degree or until the motor-spring is wound up. At this point, as will be understood from the foregoing, all lost motion of the parts on the operative side of the sprocket 13 will have been taken up, so that upon discontinuing the winding the picture-carrier and sound-producing machine will commence to operate simultaneously.

The principal object in making the pins 21 adjustable is that the apparatus may be easily and quickly adjusted, for a workman may lengthen or shorten the pins easily and quickly, so that the pictures will be released at exactly the proper moment. It is obvious, however, that this adjustability is not essential, because the pins, if correctly cut and adjusted as to length, would still, even if immovably fixed to the picture-carrier, release the pictures at the proper times; but the pins are preferably adjustable. Of course there may be only one record in the sound-producing machine, or there may be several different records, such as a tune and a conversation. I therefore do not wish to limit myself to the necessity of a single record, although this is the preferable arrangement.

It will be obvious that very many changes may be made in the construction herein disclosed without departing from the spirit of my invention. I therefore do not wish to limit myself to the particular embodiment herein shown and described.

What I claim is—

1. In a view apparatus in combination, a series of pictures, means to bring the same successively and separately into, and hold the same in, the line of vision, and means operated by the machine itself to automatically expose the different pictures for different lengths of time.

2. In a view apparatus in combination, a series of pictures, means to bring the same successively and separately into, and hold the same in, the line of vision, and means connected with the different pictures and operated by the machine itself to automatically expose the different pictures for different lengths of time.

3. In a view apparatus in combination, a series of pictures, means to bring the same successively and separately into, and hold the same in, the line of vision, and means connected with an adjacent picture to automatically regulate the length of exposure of the exposed picture.

4. In a view apparatus in combination, a series of pictures, means to bring the same successively and separately into, and hold the same in, the line of vision, and means connected with the next succeeding picture to automatically regulate the length of exposure of the exposed picture.

5. In a view apparatus in combination, a movable-picture carrier, a series of pictures carried thereby, means to bring the same successively and separately into, and hold the same in, the line of vision, and means operated by the machine itself to automatically expose the different pictures for different lengths of time.

6. In a view apparatus in combination, a rotatable-picture carrier, a series of pictures pivoted thereto at one side, means to bring the same successively and separately into, and hold the same in, the line of vision, and means to automatically expose the different pictures for different lengths of time.

7. In a view apparatus in combination, a series of pictures, means to bring the same successively and separately into, and hold the same in, the line of vision, and means to automatically regulate the length of exposure of the exposed picture including a stop and a part connected with an adjacent picture adapted to contact with said stop.

8. In a view apparatus in combination, a series of pictures, means to bring the same successively and separately into, and hold the same in, the line of vision, and means to automatically regulate the length of exposure of the exposed picture including a stop and an adjustable pin connected with the next succeeding picture adapted to contact with said stop and release said next preceding picture.

9. In a view apparatus in combination, a series of pictures, means to bring the same successively and separately into, and hold the same in, the line of vision, and means operated by the machine itself to automatically regulate the length of exposure of the different pictures, and means to automatically remove an exposed picture from the line of vision as a succeeding picture is brought into the exposed position.

10. In a view apparatus in combination, a series of pictures, means to bring the same successively and separately into, and hold the same in, the line of vision, means operated by the machine itself to automatically regulate the length of exposure of the different pictures, and means to automatically remove the exposed picture from the line of vision as the next succeeding picture is brought into the exposed position.

11. In a view apparatus in combination, a series of pictures, means to bring the same successively and separately into, and hold the same in, the line of vision, means to automatically regulate the length of exposure of the different pictures, and means operated by the movement of the next succeeding picture to automatically remove said picture from the line of vision as the next succeeding picture is brought into the exposed position.

12. In a view apparatus in combination, a series of pictures, means to bring the same successively and separately into, and hold the same in, the line of vision, means to automatically regulate the length of exposure of the different pictures, and means operated by the movement of the next succeeding picture to automatically remove said picture from the line of vision as the next succeeding picture is brought into the exposed position, including a movable rest for said exposed picture.

13. In a view apparatus in combination, a series of pictures, means to bring the same successively and separately into, and hold the same in, the line of vision, means to automatically regulate the length of exposure of the different pictures, and means operated by the movement of the next succeeding picture to automatically remove the exposed picture from the line of vision as the next succeeding picture is brought into the exposed position, including a movable rest for said exposed picture and a part connected therewith adapted to contact with and be moved by said succeeding picture.

14. In a view apparatus in combination, a series of pictures, means to bring the same successively and separately into, and hold the same in, the line of vision, means to automatically regulate the length of exposure of the different pictures, and means operated by the movement of the next succeeding picture to automatically remove the exposed picture from the line of vision as the next succeeding picture is brought into the exposed position, including a movable rest for said exposed picture and a part connected therewith adapted to contact with and be moved by said succeeding picture as the same is brought into the line of vision.

15. In a view apparatus in combination, a sound-producing machine, a series of pictures, means to operate said machine and bring said pictures successively and separately into, and hold the same in, the line of vision, and means operated by the machine itself to automatically expose the different pictures for different lengths of time.

16. In a view apparatus in combination, a sound-producing device, a series of pictures, means to operate said machine and bring said pictures successively and separately into, and hold the same in, the line of vision while the said sound-producing device is producing the sounds allotted to the pictures, and means to automatically remove the exposed picture as the next succeeding picture is brought into the exposed position.

17. In a device of the character described, a pivoted picture, a pivoted lever, a cam on said lever, a rest on said lever to hold said picture in its exposed position, and a second rest intermediate of said cam and said first rest to catch said picture before it reaches said first rest, and means to release said picture from said intermediate rest.

18. In a device of the character described, a shaft, means to rotate the same in one direction, a driving-sprocket mounted on said shaft, means to move said sprocket to a predetermined position and means to retain said sprocket in said position while said shaft is being wound in a direction opposite to that first mentioned but to release the same when said winding is discontinued.

19. In a device of the character described, a shaft, means to rotate the same in one direction, a sprocket loosely mounted on said shaft, frictional means to rotate said sprocket when said shaft is wound in a reverse direction, means to automatically arrest the rotation of said sprocket and allow continued winding of said shaft and means to positively rotate said sprocket when said winding is discontinued.

20. In a view apparatus in combination, a picture-carrier, a sound-producing device, a driving-shaft connected thereto, means to rotate said shaft in one direction, means connecting said shaft with said picture-carrier, means to hold said picture-carrier in a desired position during the operation of winding said shaft, and means to start the movement of said picture-carrier and said sound-producing device simultaneously.

21. In a view apparatus in combination, a picture-carrier, a sound-producing device, a driving-shaft connected thereto, means to rotate said shaft in one direction, a cam loosely mounted on said shaft, a shoulder on said cam, a laterally-yielding stop, a ratchet rigidly mounted on said shaft, a spring-pressed pawl carried by said cam and engaging with said ratchet, and a connection between said cam and said picture-carrier.

Signed at New York, N. Y., this 19th day of December, 1899.

LEONARD G. SPENCER.

Witnesses:
R. C. MITCHELL,
GEORGE T. HACKLEY.